United States Patent
Zaborszki

(10) Patent No.: US 11,708,921 B2
(45) Date of Patent: Jul. 25, 2023

(54) METAL HOSE WITH CRIMPED COLLAR WELD END

(71) Applicant: Swagelok Company, Solon, OH (US)

(72) Inventor: Stephen J. Zaborszki, Northfield Center, OH (US)

(73) Assignee: Swagelok Company, Solon, OH (US)

( * ) Notice: Subject to any disclaimer, the term of this patent is extended or adjusted under 35 U.S.C. 154(b) by 0 days.

(21) Appl. No.: 17/411,423

(22) Filed: Aug. 25, 2021

(65) Prior Publication Data

US 2022/0065370 A1 Mar. 3, 2022

Related U.S. Application Data

(60) Provisional application No. 63/070,395, filed on Aug. 26, 2020.

(51) Int. Cl.
*F16L 13/02* (2006.01)
*F16L 33/26* (2006.01)

(52) U.S. Cl.
CPC ....... *F16L 13/0236* (2013.01); *F16L 13/0209* (2013.01); *F16L 33/26* (2013.01)

(58) Field of Classification Search
CPC ... F16L 13/0236; F16L 33/01; F16L 13/0209; F16L 13/141; F16L 33/26; F16L 25/0036; F16L 11/15; F16L 2013/145; F16L 27/11; F16L 27/111
USPC .................. 285/288.11, 288.9, 903
See application file for complete search history.

(56) References Cited

U.S. PATENT DOCUMENTS

| | | | | |
|---|---|---|---|---|
| 2,516,631 A | * | 7/1950 | Jacobson | F16L 33/01 |
| 2,666,657 A | * | 1/1954 | Howard | 285/288.11 |
| 3,023,496 A | | 3/1962 | Humphrey | |
| 3,307,589 A | * | 3/1967 | Sheffield | F16L 33/26 |
| 4,089,351 A | | 5/1978 | Ward | |
| 4,227,639 A | | 10/1980 | Blumenberg | |
| 4,691,550 A | | 9/1987 | Dietzel | |
| 5,069,253 A | * | 12/1991 | Hadley | F16L 11/15 |
| 5,263,747 A | | 11/1993 | Lefebvre | |
| 5,297,586 A | * | 3/1994 | McIntosh | F16L 33/26 138/121 |

(Continued)

FOREIGN PATENT DOCUMENTS

| | | |
|---|---|---|
| CN | 201198932 | 2/2009 |
| CN | 201925625 | 8/2011 |

(Continued)

OTHER PUBLICATIONS

International Standard, ISO 10380, Third Edition, Oct. 1, 2012, "Pipework—Corrugated metal hoses and hose assemblies", 44 pgs.

(Continued)

*Primary Examiner* — Zachary T Dragicevich
*Assistant Examiner* — William S. Choi
(74) *Attorney, Agent, or Firm* — Calfee, Halter & Griswold LLP

(57) ABSTRACT

A hose assembly includes a metal hose, an end connection having a distal end defining a fluid connector and a proximal end defining a tube stub received in a distal end portion of the hose, and a weld collar surrounding the distal end portion of the hose and the tube stub of the end connection, with the weld collar, the hose distal end portion, and the tube stub being welded together at a welding zone proximal to a distal edge of the metal hose.

20 Claims, 3 Drawing Sheets

(56) References Cited

U.S. PATENT DOCUMENTS

| | | | |
|---|---|---|---|
| 5,511,720 A | 4/1996 | Zaborszki | |
| 5,511,828 A * | 4/1996 | Kurek | F16L 27/11 |
| 5,638,869 A | 6/1997 | Zaborszki | |
| 5,803,511 A | 9/1998 | Bessette | |
| 5,813,438 A * | 9/1998 | Reed | F16L 33/26 |
| | | | 285/903 |
| 6,016,842 A | 1/2000 | Rooke | |
| 6,561,690 B2 | 2/2003 | Chen | |
| 8,727,338 B2 | 5/2014 | DiPalma | |
| 8,844,579 B2 * | 9/2014 | Eguchi | F16L 27/111 |
| 8,997,794 B2 * | 4/2015 | Kwon | F16L 25/0036 |
| | | | 285/903 |
| 9,273,810 B1 * | 3/2016 | Martin | F16L 33/01 |
| 2004/0112454 A1 | 6/2004 | Takagi | |
| 2007/0079885 A1 | 4/2007 | Zaborszki | |
| 2020/0278055 A1 | 9/2020 | Zaborszki | |

FOREIGN PATENT DOCUMENTS

| | | |
|---|---|---|
| DE | 102014114470 | 4/2014 |
| EP | 719970 | 2/1983 |
| EP | 202481 | 11/1986 |
| EP | 939266 | 9/1999 |
| EP | 1707860 | 3/2009 |
| EP | 2469143 | 6/2012 |
| EP | 2327914 | 8/2013 |
| FR | 2759141 A1 | 8/1998 |

OTHER PUBLICATIONS

International Search Report and Written Opinion from PCT/US2021/047469 dated Nov. 17, 2021.

* cited by examiner

METAL HOSE WITH CRIMPED COLLAR WELD END

CROSS-REFERENCE TO RELATED APPLICATION

This application claims priority to and all benefit of U.S. Provisional Patent Application Ser. No. 63/070,395, filed on Aug. 26, 2020, for METAL HOSE WITH CRIMPED COLLAR WELD END, the entire disclosure of which is fully incorporated herein by reference.

TECHNICAL FIELD

The present disclosure relates to flexible hose assemblies and to methods of making flexible hose assemblies. More particularly, the disclosure relates to flexible metal hoses having a weld connection between a tube (e.g., annular or helical corrugated tube) and an end connection configured to minimize or eliminate entrapment areas between the tube end and the welded end connection.

SUMMARY OF THE DISCLOSURE

In accordance with an exemplary embodiment of the present disclosure, a hose assembly includes a metal hose, an end connection having a distal end defining a fluid connector and a proximal end defining a tube stub received in a distal end portion of the hose, and a weld collar surrounding the distal end portion of the hose and the tube stub of the end connection, with the weld collar, the hose distal end portion, and the tube stub being welded together at a welding zone proximal to a distal edge of the metal hose.

In accordance with another exemplary embodiment of the present disclosure, a method of making a hose assembly is contemplated. In an exemplary method, a distal end portion of a metal hose is inserted into a proximal end of a weld collar. A proximal end tube stub of an end connection is inserted into the distal end portion of the metal hose, such that the distal end portion of the metal hose is radially disposed between the weld collar and the tube stub. The weld collar, the hose distal end portion, and the tube stub are together at a welding zone proximal to a distal edge of the metal hose.

In accordance with another exemplary embodiment of the present disclosure, a method of making a weld collar for a hose end is contemplated. In an exemplary method, a tube section is provided. Using a crimping tool, the tube section is crimped to form a radially inward extending distal end portion defining an internal stepped portion, a tapered proximal end portion, and an intermediate portion extending axially and radially between the proximal end portion and the distal end portion.

DESCRIPTION OF THE EXEMPLARY EMBODIMENTS

Figure 1:
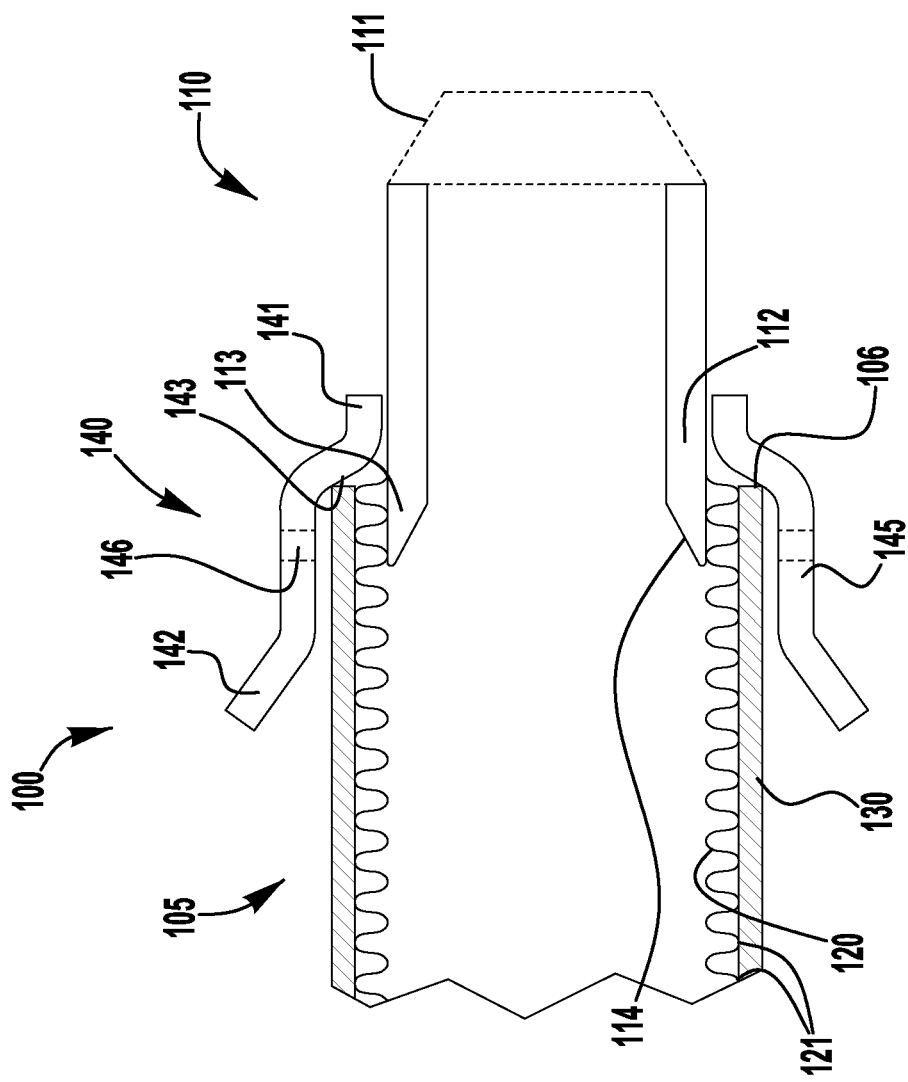
FIG. 1 is a cross-sectional view of an end portion of a hose assembly, shown in a loosely assembled, pre-crimped and pre-welded condition, in accordance with an exemplary embodiment of the present disclosure.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Many applications have requirements for flexible hose to provide a fluid connection between two points in a fluid system, with the flexibility of the hose allowing for various fluid line routing requirements, thermal expansion, misalignment, and intermittent or continuous flexing (e.g., due to system vibrations). A flexible metal hose configured to provide, for example, desired system temperature ratings, system pressure ratings, chemical compatibility, and gas impermeability, commonly includes an inner metal tube corrugated to promote flexibility and an outer sheath, cover or other such reinforcement layer (e.g., a metal braided sheath) providing protection for the metal tube while permitting bending movement.

To facilitate installation into a fluid system, hose assemblies are commonly provided with any of a variety of end connectors, including, for example, tube fittings, tube ends (e.g., for welding or installation in a tube fitting), or quick disconnect couplings, and therefore require a leak-tight connection between the inner and outer flexible hose tube components and the end connection. For metal hose assemblies, such end connectors are commonly welded to the hose ends. In some such applications, welds performed on metal tube corrugations and sheath braiding of a metal hose may generate contaminants (e.g., loose burrs) and/or entrapment areas, which may be undesirable in some fluid systems.

According to an exemplary aspect of the present disclosure, a metal hose and welded end connection may be configured to provide a welded zone free from entrapment areas by capturing a distal tube end of the hose between a crimped outer weld collar and a proximal tube end of the end connection, and welding the weld collar, hose tube end, and end connection tube end together. Such an arrangement may allow for automatic (e.g., orbital) welding of the hose ends, thereby reducing weld times and weld skill requirements, and providing for improved yields of leak tight assemblies.

Figure 2:
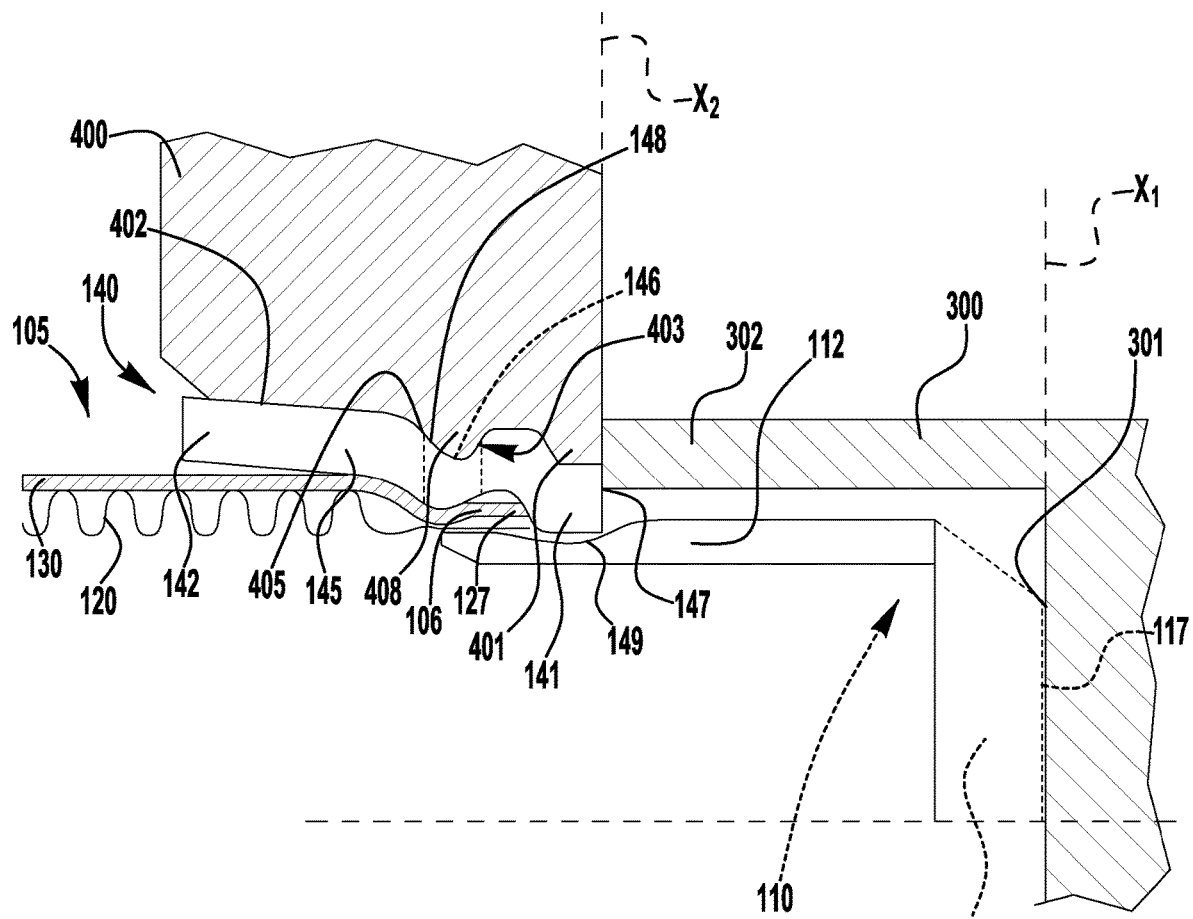
FIG. 2 is a half cross-sectional view of an end portion of a hose assembly, shown in a crimped, pre-welded condition, in accordance with an exemplary embodiment of the present disclosure.
Figure 3:
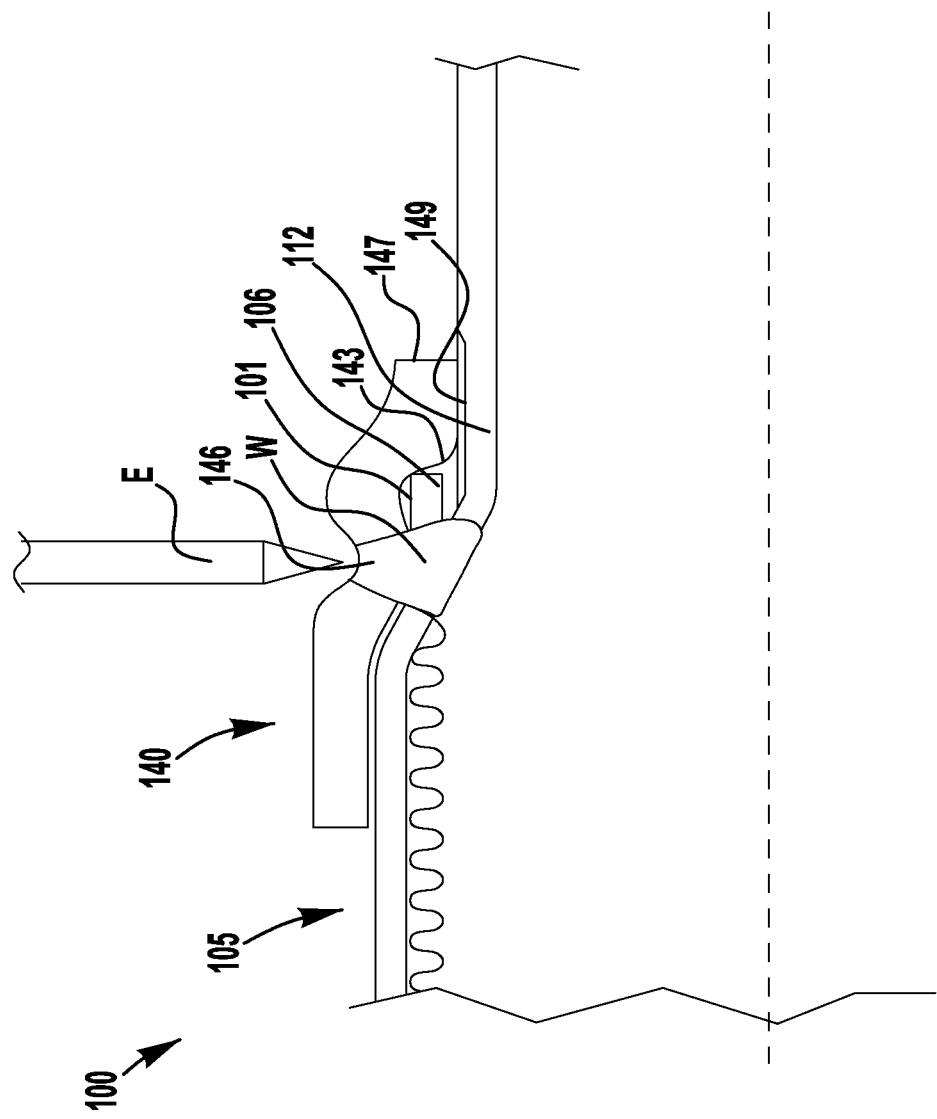
FIG. 3 is a half cross-sectional view of an end portion of a hose assembly, shown in a crimped and welded condition in accordance with an exemplary embodiment of the present disclosure.

In an exemplary embodiment, as shown in the cross-sectional views of FIGS. 1-3, a metal hose assembly 100 includes a metal end connection 110, a hose 105, and a metal weld collar 140. The hose assembly components may be provided in any suitable material, including, for example, stainless steel, Hastelloy®, and other alloys that can be autogenously welded. Further, while the drawings only show one end of the hose assembly 100, it is to be understood that an opposite end of the hose assembly may, but need not, include a similar end connection and corresponding attachment arrangement.

The exemplary end connection 110 includes a distal end connector, shown schematically at 111, for connecting with a fluid system (e.g., a tube fitting, tube stub, quick disconnect coupling), and a proximal end tube stub 112 insertable into the hose 105 and weldable with the weld collar 140 and hose, as described in greater detail below.

The exemplary hose 105 includes a corrugated metal tube 120 and surrounding sheath 130 (e.g., a braided metal sheath). The corrugated tube 120 includes a plurality of corrugations 121, with crest portions engaging and supporting the sheath 130, and root portions defining an inner diameter of the hose 105. In other embodiments, other hose constructions may be used, including, for example, a corrugated metal tube with a different reinforcing sheath, a corrugated metal tube without a reinforcing sheath, a tube having cylindrical end cuffs (e.g., integrally formed, welded, etc.), or a hose having a coiled wire ("spring guard") or flat coil ("armor guard") sleeve on the outer diameter and/or inner diameter of the metal hose.

The exemplary weld collar 140 includes a narrowed distal end portion 141 and an expanded proximal end portion 142. As initially installed (FIG. 1), a distal edge 106 of the hose 105 is received in the proximal end portion 142 of the weld collar 140 and into abutment with a stepped portion 143 of the weld collar, thereby preventing extrusion of the corrugated tube 120 past the distal end portion 141 of the weld collar. As shown, the weld collar 140 may (but need not) be provided with an outward tapered proximal end portion 142 (e.g., an inner diameter taper of approximately 20°), for example, to facilitate funneling of the hose end 105 (often including cut/frayed braiding) into the weld collar 140. An intermediate portion 145 of the weld collar may include an inner diameter sized for slip fit engagement with the sheath 130 of the inserted hose end 105.

Figure 1A:
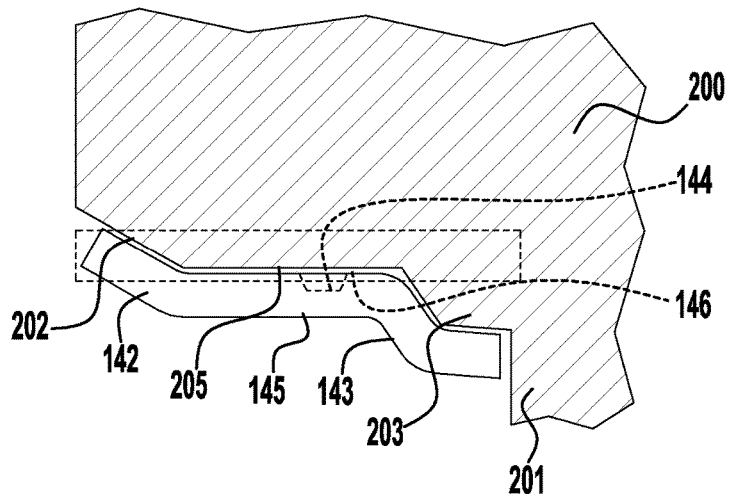
FIG. 1A is a half cross-sectional view of the weld collar of the hose assembly of FIG. 1, shown with a crimping tool for forming the weld collar from a tube stub.

The weld collar may be formed using a variety of manufacturing processes, including, for example, machining, additive manufacturing, deep draw from sheet, or crimp formed from tube. In an exemplary embodiment, as shown in FIG. 1A, the weld collar 140 may be formed by crimping a section of thin-walled tube (shown in phantom at 140'), using a crimping tool 200. The exemplary collar forming crimping tool 200 includes a distal inner wall 201 providing a stop for the thin-walled tube end, a shoulder portion 203 for forming the stepped portion 143 of the weld collar 140, an intermediate portion 205 for forming the intermediate portion 145 of the weld collar, and a tapered proximal end portion 202 for forming the outward tapered proximal end portion 142 of the weld collar. While many different size tube sections may be used, in an exemplary embodiment, a ¾" nominal diameter, 0.049" wall thickness stainless steel tube section about 1.0" long is used to form a weld collar for a ¼" diameter hose end.

As shown in FIG. 1, the end connection tube stub 112 may be inserted into the hose 105 to a depth selected to align a proximal end or nose portion 113 of the tube stub with a designated welding zone 146 on the intermediate portion 145 of the weld collar 140, proximal to the stepped portion 143 of the weld collar, to ensure a complete, uniform weld proximal to the distal edge 106 of the hose 105. As discussed in greater detail below, a tight fit between the weld collar 140, hose 105, and tube stub nose portion 113 in the welding zone 146 provide for a full penetration weld that consumes this endmost nose portion of the tube stub 112, such that there is no portion of the tube stub extending proximal to the weld that could form areas of entrapment within the hose end. As shown, the proximal end 113 of the tube stub 112 may include an inner diameter chamfer 114, for example, to aid in flow of weld purge gas, and/or to facilitate generation of a full penetration weld at the tube stub end.

Many arrangements may be used to properly align the end connection tube stub 112 within the weld collar 140. In the illustrated embodiment, as shown in FIG. 2, an alignment tool 300 includes a distal base wall 301, defining a first datum plane x1, for engaging a distal end face 117 of the end connection 110, and an axially extending proximal wall 302, defining a second datum plane x2, for engaging a distal end face 147 of the weld collar 140, to properly align the welding zone 146 of the weld collar with the tube stub proximal end 113.

In this aligned arrangement, a hose connection crimping tool 400 (which may be positioned by the proximal wall 302 of the alignment tool 300) may be used to form a crimped or compressed attachment of the weld collar 140, hose 105, and end connection 110 prior to welding. In an exemplary embodiment, as shown in FIG. 2, the hose connection crimping tool 400 includes a distal end 401 that compresses the distal end 141 of the weld collar 140 into an interference fit with the end connection tube stub 112 to maintain the axial positions of the weld collar and end connection prior to welding. An intermediate portion 405 of the exemplary hose connection crimping tool 400 includes a raised rib or projection 408 positioned and configured to form an annular recess or groove 148 in the welding zone 146 of the weld collar 140, to provide a weld joint centerline locating feature in the welding zone, and to create a reverse taper that will lock and hold the corrugated tube 120 and braided sheath 130 in place prior to welding. Between the welding zone 146 and the proximal end 142 of the weld collar 140, a hose securing portion 402 of the hose connection crimping tool 400 may be configured to apply a nominal interference fit between the weld collar 140 and the hose 105, while maintaining a slip fit at the proximal end 142 of the weld collar, for example, to provide a tight fit near the weld location and eliminate flexing and movement of the hose near the weld area. Between the welding zone 146 and the distal end 141 of the weld collar 140, a hose compressing portion 403 of the hose connection crimping tool 400 may be configured to substantially flatten the compressed portion of the corrugated tube 120 into a cuff-like geometry 127. In some applications, this tight engagement with the core tube may allow for welding a wider variety of core tubes, including, for example, helical and multi-ply helical core tubes, and/or may promote withdrawal of weld heat away from the braid wire resulting in maintaining cold worked strength in the wire. In some embodiments, a notch 144 (shown in phantom in FIG. 1A) may be formed (e.g., cut or machined) in the welding zone 146 of the weld collar 140 prior to installation, reducing the wall thickness in the weld collar welding zone to facilitate groove formation and hose compression during crimping, and/or to facilitate weld penetration and control the edge of the weld puddle for improved weld aesthetics.

While many different types of weld arrangements may be used, the end connection 110, hose 105, and weld collar 140 may be configured to accommodate an autogenous weld, by which the weld may be formed by the end connection, corrugated tube, and weld collar materials without the addition of a filler material. In such an arrangement, the thinned-down welding zone of the weld collar may (but need not) include an enlarged rib (not shown) providing sacrificial weld material to facilitate formation of the autogenous weld. This enlarged rib may further facilitate weld positioning or component alignment. In other embodiments, the welded assembly may use a filler material. Further, the welding operation may involve movement of the weld electrode around the weld collar (i.e., an orbital weld), or rotation of the workpiece components proximate a stationary electrode. In other arrangements, the electrode/torch may oscillate, or a magnetic arc control may be used to stitch the weld puddle, thereby aiding in the wetting of all weld components to the weld puddle for inclusion into the weld.

As a result of an autogenous welding operation, portions of the tube stub 112, hose 105, and weld collar 140 (at welding zone 146) are consumed in a weld puddle during a welding operation (using electrode E) to form a uniform, full penetration weld bead W, as shown in FIG. 3. Because the hose distal edge extends around and axially distal to welded portion of the tube stub 112, the hose edge is disposed outside of the hose flowpath (i.e., is not wetted), and therefore does not form entrapment areas or loose burrs or other contaminants within the flowpath. This facilitates cleaning, and maintaining a clean condition, of the internal flowpath of the hose, and allows for the elimination of a deburring step for the cut hose, as the cut area containing potential burrs is outside of the weld zone and isolated from the hose flowpath. Further, the extension of the braided sheath 130 past the welding zone (over and past the tube stub proximal end 113) ensures that all braid wires are included in and penetrated by the weld, as compared to welding of a terminated end of a braided sheath, in which one or more of the terminated braid wires may pull or melt back and not be included in the weld. In the present invention, the braid is penetrated by the weld.

The weld arrangement described above may produce an enclosed space 101 between the welding zone 146 and the stepped portion 143 of the weld collar 140. In another exemplary feature of the hose assembly, an outer surface of the tube stub 112 extending across this enclosed space, and compressed against the weld collar distal end 141, may include one or more grooves, notches, or knurled surfaces 149 that form flow paths extending axially from the enclosed space to the distal end face 147 of the weld collar 140, allowing for venting of weld gases during welding, for example, to prevent a weld blowout. Other venting arrangements may additionally or alternatively be used, including, for example, a vent hole machined or otherwise formed in the distal end wall of the weld collar.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

I claim:

1. A hose assembly comprising:
a metal hose extending in a first direction from a distal end portion to a proximal end portion;
an end connection extending in the first direction from a distal end portion defining a fluid connector to a proximal end portion defining a tube stub received in the distal end portion of the metal hose; and
a weld collar extending in the first direction from a distal end portion surrounding the end connection to a proximal end portion surrounding the metal hose, with an intermediate portion of the of the weld collar surrounding the distal end portion of the metal hose and the tube stub of the end connection, with the intermediate portion of the weld collar, the distal end portion of the metal hose, and the tube stub being welded together at a welding zone proximal to a distal edge of the metal hose;
wherein a proximal edge of the tube stub is disposed at the welding zone, such that the tube stub does not extend proximal to the welding zone.

2. The hose assembly of claim 1, wherein the distal end portion of the weld collar is compressed against an outer surface of the tube stub.

3. The hose assembly of claim 2, wherein the distal end portion of the weld collar defines a stepped portion abutting the distal edge of the metal hose.

4. The hose assembly of claim 2, wherein the weld collar and the end connection define an enclosed space between the welding zone and the distal end portion of the weld collar, wherein the outer surface of the tube stub includes one or more grooves, notches, or knurled surfaces that form flow paths extending axially from the enclosed space to a distal end face of the weld collar.

5. The hose assembly of claim 2, wherein the weld collar and the end connection define an enclosed space between the welding zone and the distal end portion of the weld collar, and wherein the distal edge of the metal hose is disposed in the enclosed space.

6. The hose assembly of claim 1, wherein the weld collar includes a hose compressing portion between the welding zone and the distal end portion of the weld collar, wherein the distal end portion of the metal hose is compressed between the hose compressing portion and the tube stub to form a flattened distal cuff portion of the metal hose.

7. The hose assembly of claim 6, wherein the metal hose comprises a corrugated metal tube and the distal cuff portion comprises a plurality of inwardly flattened corrugations.

8. The hose assembly of claim 1, wherein the weld collar includes an annular recessed portion at the welding zone.

9. The hose assembly of claim 8, wherein the annular recessed portion has a reduced wall thickness relative to the proximal and distal end portions of the weld collar.

10. The hose assembly of claim 8, wherein the annular recessed portion includes a reverse tapered inner diameter.

11. The hose assembly of claim 1, wherein the metal hose comprises a corrugated metal tube surrounded by a braided metal sheath.

12. The hose assembly of claim 1, wherein the metal hose comprises a corrugated metal tube.

13. A method of making a hose assembly, the method comprising:
- inserting a distal end portion of a metal hose into a proximal end portion of a weld collar, with the metal hose extending in a first direction from the distal end portion to a proximal end portion, and the weld collar extending in the first direction from a distal end portion to the proximal end portion;
- inserting a tube stub on a proximal end portion of an end connection into the distal end portion of the metal hose, such that the distal end portion of the metal hose is radially disposed between an intermediate portion of the weld collar and the tube stub, with the end connection extending in the first direction from a distal end portion to the proximal end portion; and
- welding the weld collar, the hose distal end portion, and the tube stub together at a welding zone proximal to a distal edge of the metal hose;
- wherein inserting the tube stub into the distal end portion of the metal hose comprises aligning a proximal edge of the tube stub with the welding zone, such that the tube stub does not extend proximal to the welding zone.

14. The method of claim 13, wherein inserting the distal end portion of the metal hose into the proximal end portion of the weld collar comprises abutting the distal edge of the metal hose with a radially inward extending portion at the distal end portion of the weld collar.

15. The method of claim 13, further comprising radially compressing the distal end portion of the weld collar against an outer surface of the tube stub.

16. The method of claim 13, further comprising radially compressing a hose compressing portion of the weld collar between the welding zone and the distal end portion, thereby compressing the distal end portion of the metal hose between the hose compressing portion and the tube stub to form a flattened distal cuff portion of the metal hose.

17. The method of claim 13, further comprising radially compressing the welding zone of the weld collar to form a reverse taper inner diameter at the welding zone, the reverse taper inner diameter interlocking with the distal end portion of the metal hose.

18. The method of claim 13, further comprising crimping the weld collar against the distal end portion of the metal hose and the tube stub prior to welding the weld collar, the distal end portion of the metal hose, and the tube stub together at the welding zone.

19. The method of claim 13, wherein the metal hose comprises a corrugated metal tube surrounded by a braided metal sheath.

20. The method of claim 13, wherein the metal hose comprises a corrugated metal tube.

* * * * *